Sept. 11, 1945.  A. C. MURPHY  2,384,562
SAFETY CUTOFF SWITCH
Filed July 3, 1944
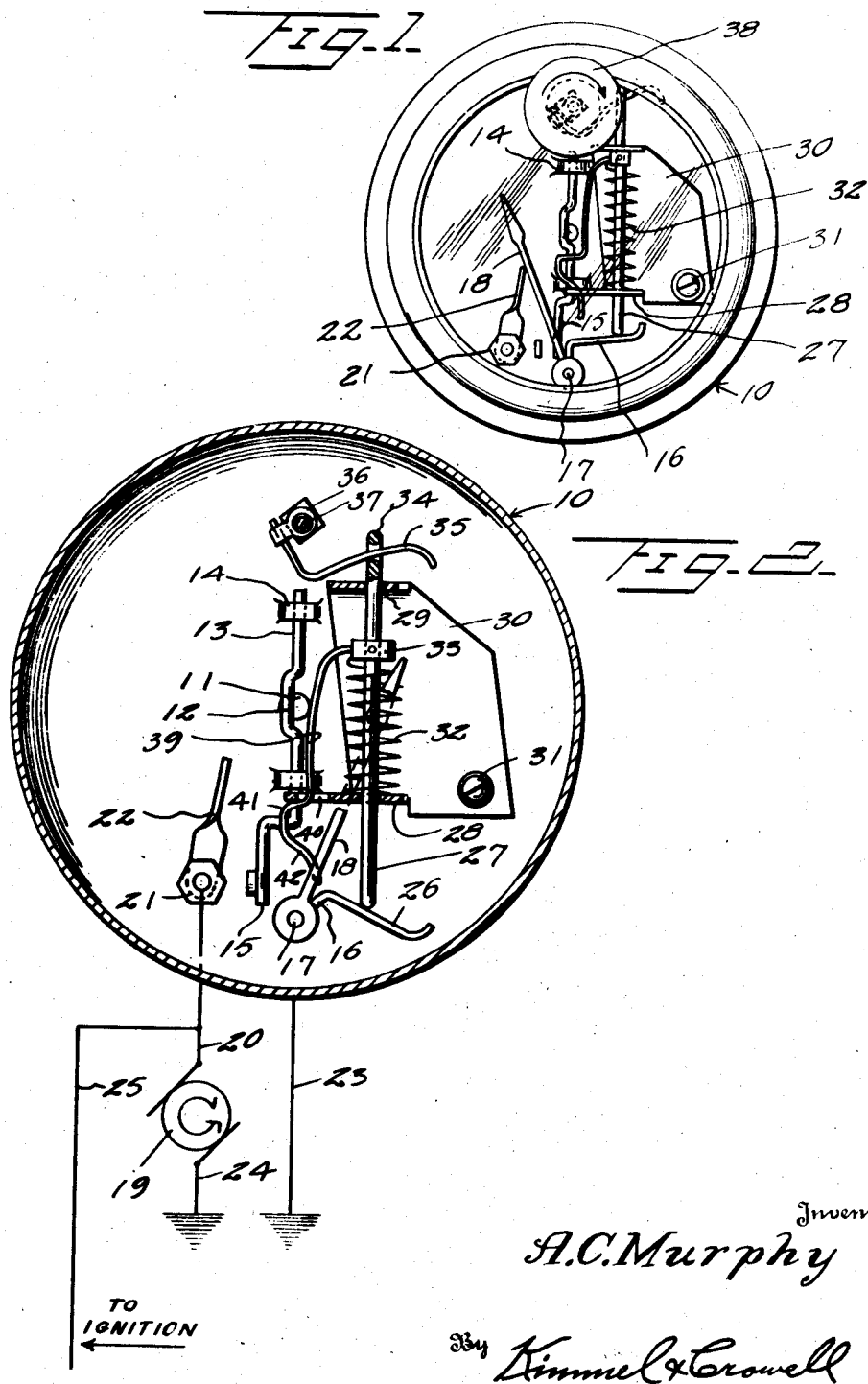
Inventor
A.C.Murphy
By Kimmel & Crowell
Attorneys Patented Sept. 11, 1945

2,384,562

UNITED STATES PATENT OFFICE 2,384,562

SAFETY CUTOFF SWITCH

Arthur C. Murphy, Tulsa, Okla.

Application July 3, 1944, Serial No. 543,295

7 Claims. (Cl. 200—56)

This invention relates to a combined pressure gauge and electric switch for an internal combustion engine.

An object of this invention is to provide the combination of a pressure gauge, such as an oil or liquid gauge, and an electric switch, the switch being interposed in the ignition circuit of an internal combustion engine and adapted to ground the circuit upon reduction of oil pressure to a predetermined degree.

Another object of this invention is to provide a switch of this kind which can be readily adjusted so as to ground the circuit when the liquid pressure reaches a predetermined low degree.

A further object of this invention is to provide in an electric switch of this type, an improved means for manually setting the switch in open or circuit breaking position so that the ignition circuit will not be grounded when the engine is being started and there is no pressure to hold the switch open.

A further object of this invention is to provide a switch of this type which can be attached to a conventional pressure gauge and will not interfere with the normal operation of the gauge.

In the drawing:

Figure 1 is a detail front elevation of a combined gauge and ignition controlling switch constructed according to an embodiment of this invention; and Figure 2 is an enlarged vertical section of the gauge showing diagrammatically the electric circuit with which the gauge is incorporated.

Referring to the drawing, the numeral 10 designates generally a housing for a pressure gauge which, in the present instance, is an oil or liquid pressure gauge of conventional construction. The gauge includes a plunger 11 which is adapted to engage an offset 12 carried by a crank shaft 13. The crank shaft 13 is journalled in bearings 14 carried by the housing 10 at the rear thereof, and the crank shaft 13 is also provided at one end thereof with a bell crank 15 which is adapted to engage an arm 16 carried by a pointer shaft 17. A pointer 18 is secured to the shaft 17 and is adapted to be moved across the face of a dial (not shown) so as to indicate the pressure of liquid as in a lubricating system or the like.

In order to provide a means whereby the internal combustion engine which is connected to the gauge herein disclosed may be cut off or stopped when liquid pressure drops to a predetermined degree, I have provided a switch which is mounted within the housing 10 and connected to the magneto 19. The magneto 19 is connected by means of a conductor 20 to a terminal 21 which is carried by the housing 10, and the terminal 21 has correlated therewith an adjustable contact 22 positioned within the housing 10. The contact 22 is positioned in the path of the swinging movement of the pointer 18 when the latter swings toward 0 position so that the pointer 18, which constitutes a movable contact, will engage the stationary, adjustable contact 22 and thereby ground the magneto 19. The pointer 18 is grounded by means of a conductor 23, and in practice the housing 10 may be mounted on some metal portion of the engine or other metal construction forming a part of the engine or the support therefor. One side of the magneto 19 is grounded by means of a conductor 24, and the other side of the magneto is connected by means of a conductor 25 to the ignition circuit of the engine.

It will be understood that when the engine is not operating, the pointer 18 will be in engagement with contact 22 and will thereby ground the ignition circuit. In order to provide a means whereby the engine may be initially started so that the grounding circuit formed by the conductors 20 and 23 may be broken, I have provided an extension 26 which is carried by the arm 16. The extension 26 extends at an obtuse angle from the arm 16, and a vertical, movable plunger 27 at its lower end engages against the upper side of the extension 26. The plunger 27 is slidable in guides 28 and 29 formed on a base plate 30 which is secured by fastening means 31 on the inner side of the rear wall of the housing 10. The plunger 27 is constantly urged to a released position by means of a spring 32 which at its lower end bears against the collar 33 which is fixed to the plunger 27. The upper end of the plunger 27 which projects above the upper guide 29 is formed with an eye 34 and an arm 35 loosely engages through the eye 34. The arm 35 is constructed in the form of a short wire and is secured by means of a coupling member 36 to an operating shaft 37. The shaft 37 projects forwardly through the front face of the housing 10 and has secured to the outer end thereof an operating knob 38.

The plunger 27 is adapted to be held in a circuit-breaking position by means of a yieldable latch 39. The latch 39 is secured at one end to the collar 33 and slidably engages through a keeper 40 which is formed at one side of the lower guide 28. The bill 41 of the latch member 39 is adapted to engage, as shown in Figure 2, beneath the keeper 40 when the plunger 27 is lowered and thereby hold the pointer 18 in spaced relation with respect to the contact 22. The bill 41 is provided with an extension 42 which is positioned in the path of the swinging of the bell crank 15, so that when the latch member 39 is in latched position and the engine starts operating, the pressure of oil or liquid will move plunger 11 forwardly and rock shaft 13. Rocking of shaft 13 under pressure of the liquid will swing bell crank 15 to the right and bell crank 15 will engage the extension or releasing member 42 so as to thereby unlatch the latching member 39. In this manner the switch may be manually moved to a circuit-breaking position and held in such position by the latch 39, but after pressure has been built up to a predetermined degree, the pointer operating means will release the latch so that if the pressure should subsequently drop below a predetermined degree, the pointer, which constitutes the movable contact, may swing, as shown in Figures 1 and 2, to the left and engage with adjustable, stationary contact 22. When pointer 18 engages contact 22, the ground circuit comprising conductors 20 and 23 will be closed and the engine will be stopped.

This safety switch which is combined with a liquid gauge is adapted to be connected to a conventional internal combustion engine and to the ignition circuit thereof where the current is generated by means of a magneto. The engine is preferably a stationary engine which is frequently left unattended for long periods after it has been started in operation, and with the use of this cut-off switch if for any reason the pressure of oil should drop below a predetermined danger point the grounding circuit will be closed and the engine automatically stopped. To start the engine it is only necessary to turn the knob 38 clockwise as viewed in Figure 1 so as to move plunger 27 downwardly and swing pointer 18 away from contact 22, and at the same time latch 39 will engage the keeper 40 so as to hold the pointer 18 in circuit-breaking position. After pressure has been built up in the lubricating system, bell crank 15 will swing to the right and engage releasing member 42 so as to release latch 39 in order that if the oil pressure should subsequently drop below the adjusted position determined by contact 22, pointer 18 will close the grounding circuit formed by conductors 20 and 23 by engaging contact 22.

What is claimed is:

1. In combination a pressure gauge including a housing adapted to be interposed in one side of an electric circuit, a swingable pointer in said housing and constituting a movable contact, operating means for said pointer, a stationary contact in said housing also interposed in said circuit and positioned in the path of the movement of said pointer in one direction, manually operable means for holding said pointer in circuit breaking position, and means carried by said latter means engageable with said operating means whereby to release said pointer for normal movement by said operating means.

2. In combination a pressure gauge including a housing adapted to be interposed in one side of an electric circuit, a swingable pointer in said housing and constituting a movable contact, operating means for said pointer, a stationary contact carried by said housing also interposed in said circuit and engageable with said pointer upon movement of the latter in one direction, an arm extending laterally from one side of said pointer, and means in said housing engageable with said arm for swinging said pointer away from said stationary contact.

3. In combination a pressure gauge including a housing adapted to be interposed in one side of an electric circuit, a swingable pointer in said housing and constituting a movable contact, operating means for said pointer, a stationary contact carried by said housing also interposed in said circuit and engageable with said pointer upon movement of the latter in one direction, an arm extending laterally from one side of said pointer, a spring-pressed plunger slidably carried by said housing and engageable at one end against said arm, and manually operable means for moving said plunger to rock said arm and pointer oppositely from said stationary contact.

4. In combination a pressure gauge including a housing adapted to be interposed in one side of an electric circuit, a swingable pointer in said housing and constituting a movable contact, operating means for said pointer, a stationary contact carried by said housing also interposed in said circuit and engageable with said pointer upon movement of the latter in one direction, an arm extending laterally from one side of said pointer, a spring-pressed plunger slidably carried by said housing and engageable at one end against said arm, manually operable means for moving said plunger to rock said arm and pointer oppositely from said stationary contact, latch means for holding said plunger in depressed position, and means carried by said latch means engageable with said operating means when the latter is actuated by pressure whereby to release said latch means.

5. In combination a pressure gauge including a housing adapted to be interposed in one side of an electric circuit, a swingable pointer in said housing and constituting a movable contact, operating means for said pointer, a stationary contact carried by said housing also interposed in said circuit and engageable with said pointer upon movement of the latter in one direction, an arm extending laterally from one side of said pointer, a spring-pressed plunger slidably carried by said housing and engageable at one end against said arm, manually operable means for moving said plunger to rock said arm and pointer oppositely from said stationary contact, guide means for said plunger, a resilient latch carried by and movable with said plunger to hold the latter in depressed position, a keeper for said latch carried by said guide means, and means for releasing said latch when said operating means is actuated by pressure.

6. In combination a pressure gauge including a housing adapted to be interposed in one side of an electric circuit, a swingable pointer in said housing and constituting a movable contact, operating means for said pointer, a stationary contact carried by said housing also interposed in said circuit and engageable with said pointer upon movement of the latter in one direction, an arm extending laterally from one side of said pointer, a spring-pressed plunger slidably carried by said housing and engageable at one end against said arm, manually operable means for moving said plunger to rock said arm and pointer oppositely from said stationary contact, guide means for said plunger, a resilient latch for holding the plunger in depressed position, a keeper for said latch, and means for releasing said latch when said operating means is actuated by pressure.

7. The combination set forth in claim 6 wherein said releasing means comprises an extension carried by said latch disposed in the path of the movement of said operating means.

ARTHUR C. MURPHY.